United States Patent

Mück et al.

[11] 3,956,106
[45] May 11, 1976

[54] APPARATUS AND PROCESS FOR THE PRODUCTION OF GRIT FREE FINELY DISPERSED PIGMENTS

[75] Inventors: Gustav Mück, Bruhl; Lothar Rothbühr, Hermulheim; Kurt Stoklossa, Bruhl, all of Germany

[73] Assignee: Deutsche Gold- und Silber-Scheideanstalt vormals Roessler, Frankfort am Main, Germany

[22] Filed: Feb. 11, 1974

[21] Appl. No.: 441,388

[30] Foreign Application Priority Data
Mar. 19, 1973  Germany............................ 2313614

[52] U.S. Cl................................ 209/11; 209/134; 209/140; 209/154
[51] Int. Cl.² .......................................... B07B 7/01
[58] Field of Search .................. 209/11, 134–139 R, 209/140–142, 145, 147, 154, 156, 160, 161

[56] References Cited
UNITED STATES PATENTS

| | | | |
|---|---|---|---|
| 572,091 | 11/1896 | Marsden ............................ | 209/11 X |
| 1,504,439 | 8/1924 | France ................................ | 209/138 |
| 1,846,210 | 2/1932 | Kramer ................................ | 209/137 |
| 1,873,395 | 8/1932 | Hallam et al. ........................ | 209/141 |
| 2,177,378 | 10/1939 | Schorn et al........................ | 209/134 X |
| 2,963,152 | 12/1960 | Leslie et al.................. | 209/139 R X |
| 3,278,026 | 10/1966 | Bishard........................... | 209/147 X |
| 3,308,945 | 3/1967 | Oja ................................ | 209/138 X |
| 3,365,058 | 1/1968 | Petersen ........................ | 209/154 X |

Primary Examiner—Frank W. Lutter
Assistant Examiner—Ralph J. Hill
Attorney, Agent, or Firm—Cushman, Darby & Cushman

[57] ABSTRACT

An apparatus is provided for removal of grit from a finely dispersed solid containing gas stream serving for the pneumatic conveyance of this material, the apparatus comprising a closed separator housing having a funnel shaped lower portion, a supply tube for the conveying gas stream opening laterally in the upper part of the housing, an outlet tube (in a given case connected to a vacuum source) for purified finely dispersed solid disposed opposite the supply tube in the upper part of the housing, a vertically disposed connecting piece between the lower end of the funnel shaped lower portion and a discharge valve, an axially disposed cap shaped displacement member open at its lower end in said connecting piece and of lesser diameter whereby an annular gap is formed between the displacement member and the connecting piece and a supply tube for furnishing a secondary gas stream to the interior of said displacement member. There is also described the process of removing the grit from the finely divided solid using this apparatus.

11 Claims, 7 Drawing Figures

APPARATUS AND PROCESS FOR THE PRODUCTION OF GRIT FREE FINELY DISPERSED PIGMENTS

The invention is directed to an apparatus for the removal of grit from a finely dispersed solid containing gas stream serving for the pneumatic conveyance of this stream. Furthermore it concerns a process which uses the working principle of the apparatus of the invention.

Finely dispersed materials such as carbon black and synthetic silica today find a wide field of application in industry. They serve as pigments for colors and tints in printing inks, lacquers and synthetic resins. They serve as fillers especially for reinforcing elastomers and rubber. Finely dispersed materials are produced according to widely different methods, for example by flame reactions or by wet precipitation in organic or inorganic solvents. In the pyrogenic processes the production of the finely dispersed pigments and fillers is carried out generally in a walled high temperature resistant reactor, then there is attached a separation of the pigment formed in a separating system or a filter system and finally the pigment is prepared and ready-made. In the pictured procedure there cannot be avoided that part of the wall or the separating system comes loose and contaminates the finely divided pigment produced. Also there occurs in the precipitations from the solvent phase wall reactions which allow splitting off deposits to form and so lead to the contamination of the products formed.

Without limiting the invention by example there will be shown the production of furnace black which types of impurities can come in finely dispersed pigments and fillers and what purity demands are placed on carbon black.

Among other finely dispersed fillers and pigments which can be used in the process there can be mentioned for example highly dispersed silica, e.g. fumed silica, titanium dioxide, magnesium oxide, zinc oxide, zinc sulfide, barium sulfate, calcium carbonate, magnesium carbonate, china clay, Spanish oxide, red iron oxide, burnt sienna, cadmium sulfide, raw umber, burnt umber, ocher, lead chromate, molybdenum orange, zinc yellow, cadmium yellow, chromium oxide green, ultramarine, black iron oxide, aluminum pigment, bronze powder and zinc dust.

In the production of furnace black gas is burned to a very hot, rotary flue gas in a fire resistant walled reactor and a liquid aromatic hydrocarbon is injected into this. The hydrocarbon is converted to carbon (carbon black) and hydrogen. At the appearance of the oil drops on the reactor wall a coke is formed as a contaminant of the carbon black formed. By the chipping off of reactor particles there is obtained further contaminations in the carbon black formed. The hot reaction mixture of carbon black suspended in the flue gas is strongly cooled by injecting water, then led into large separating plants made of iron in order to recover the carbon black from the large amount of gas. The injection of water causes the formation of a calcareous shell on the reactor wall, and in the separating plant there are formed large pieces of iron oxide and iron sulfide by corrosion.

As there are four major contaminant components in carbon black there are also present:
1. Coke
2. Ceramic wall pieces
3. Calcareous material and silica from the water injected.
4. Iron oxide/iron sulfide from the separating plant and the pipe lines.

Also there are welding beads, etc. from repair operations.

Since carbon black in the working up of lacquers, printing inks, synthetic resins and rubber articles is sent through extremely valuable working machines such as rollers, extruders, etc., an absolute freedom from "grit" is required. By "grit" is meant particles which are greater than 0.043 mm (43 $\mu$m). The following requirements today are raised:

Carbon black for normal rubber articles — the grit content should be less than 0.05%.

Carbon black for special rubber articles — the grit content should be less than 0.01% Special pigments — The grit content should be less than 0.005%.

The grit content was determined according to DIN 53580 (German Industrial Standards) by wet sieving on a 0.043 mm sieve. Additionally to the already mentioned limitation there is still the requirement that particles generally are not permitted to occur over 0.500 mm.

It is clear that the keeping of this requirement in an industrially large scale product with the many depicted possibilities of impurities runs into difficulties. Large scale sieving with a sieve of 0.043 mm has proven impossible. The use of mills likewise has not led permanently to success because not all of the impurities mentioned grind well, and because in grinding only a reduction in size, but not a removal of the disturbing products takes place. In practice and in the literature separators are known which effect a sedimentation of the heavy particles by a spiral movement of the finely dispersed material distributed in the air or which produces this action in the form of a cyclone disguised by addition of foreign air. However, the apparatus has the disadvantages that a very high pressure drop takes place in it (200–500 mm water pressure), so that there must be enormous electrical energy required for operation of the blowers required. The effective apparatus parts mostly contain narrow gaps. These, for example, become completely stopped by several carbon blacks so that no controlled operation is possible.

As has also been previously mentioned finely dispersed pigments and fillers are first produced, separated and pneumatically conveyed in this light powder form to the place at which the further processing takes place. The problem to be solved is to conceive an apparatus for taking the pneumatically conveyed material and which removes all "grit constituents" from the finely dispersed pigment or finely dispersed filler without causing loss in pressure, and operates without substantial maintenance and which does not clog.

It has now been shown that this problem has been solved very effectively and surprisingly with a relatively simple apparatus and process.

Accordingly the invention first is concerned with an apparatus for the removal of grit from a dispersed solid material containing gas stream serving to pneumatically convey this material.

The apparatus is characterized by a closed separator housing having a funnel shaped lower portion, a supply tube or pipe for the conveying gas stream opening laterally in the upper part of the housing generally above said funnel shaped portion, an outlet tube (in a given case connected to a vacuum source) for purified finely dispersed solid opening into the upper portion of the housing and opposite the supply tube in the upper part of the housing, a vertically disposed connecting piece between the lower end of the funnel shaped lower portion and a discharge valve, an axially disposed cap shaped displacement member open at its lower end in said connecting piece and of lesser diameter whereby an annular gap is formed between the displacement and the connecting piece and a supply tube for furnishing a secondary gas stream to the interior of the displacement member.

In order to adjust the distance of falling for the grit to the finely dispersed pigment to be purified, in a preferred form of the invention, the inlet tube for the conveying stream can be slidably built into the separator housing.

A further variant of the apparatus of the invention makes it possible to obtain a nearly equal falling distance for all particles. This consists of reducing the supply tube before the separator housing flow favorably to rectangular or circular cross-section, preferably a flat rectangle or oval.

In order to avoid carrying along the already separated grit constituents it has proven favorable to allow the outlet tube to project as a funnel into the separator housing. Thereby the departing flow is not accelerated spontaneously but gradually.

A sticking of pigments and fillers to the inner walls of the separator housing can be counteracted if the outer jacket of the separator housen according to a further advantageous form of the invention is provided with heating coils.

For optimal adjustment of the secondary gas stream the supply tube for the secondary gas stream can be provided with a suitable dosaging valve.

As the air lock for removal of solids there is preferably employed a bucket wheel valve.

The invention further includes a process for removal of grit from a gas stream for pneumatically conveying finely dispersed solids contained therein, which process employs the described apparatus. The process is characterized in that the grit containing aerosol is led through a widened space or chamber and secondary air is led counter to the grit sinking under the force of gravity and containing suspended therein a minor portion of the finely dispersed solid materials intended to be conveyed further. In this connection, as shown in FIG. 1, it is preferred to introduce an annular secondary gas stream perpendicular to the grit containing aerosol. The secondary gas stream separates the finely dispersed solids and permits them to rejoin the main portion of the finely dispersed solids and to be removed near the top of the chamber.

The invention will be understood best in connection with the drawings wherein.

Figure 1:
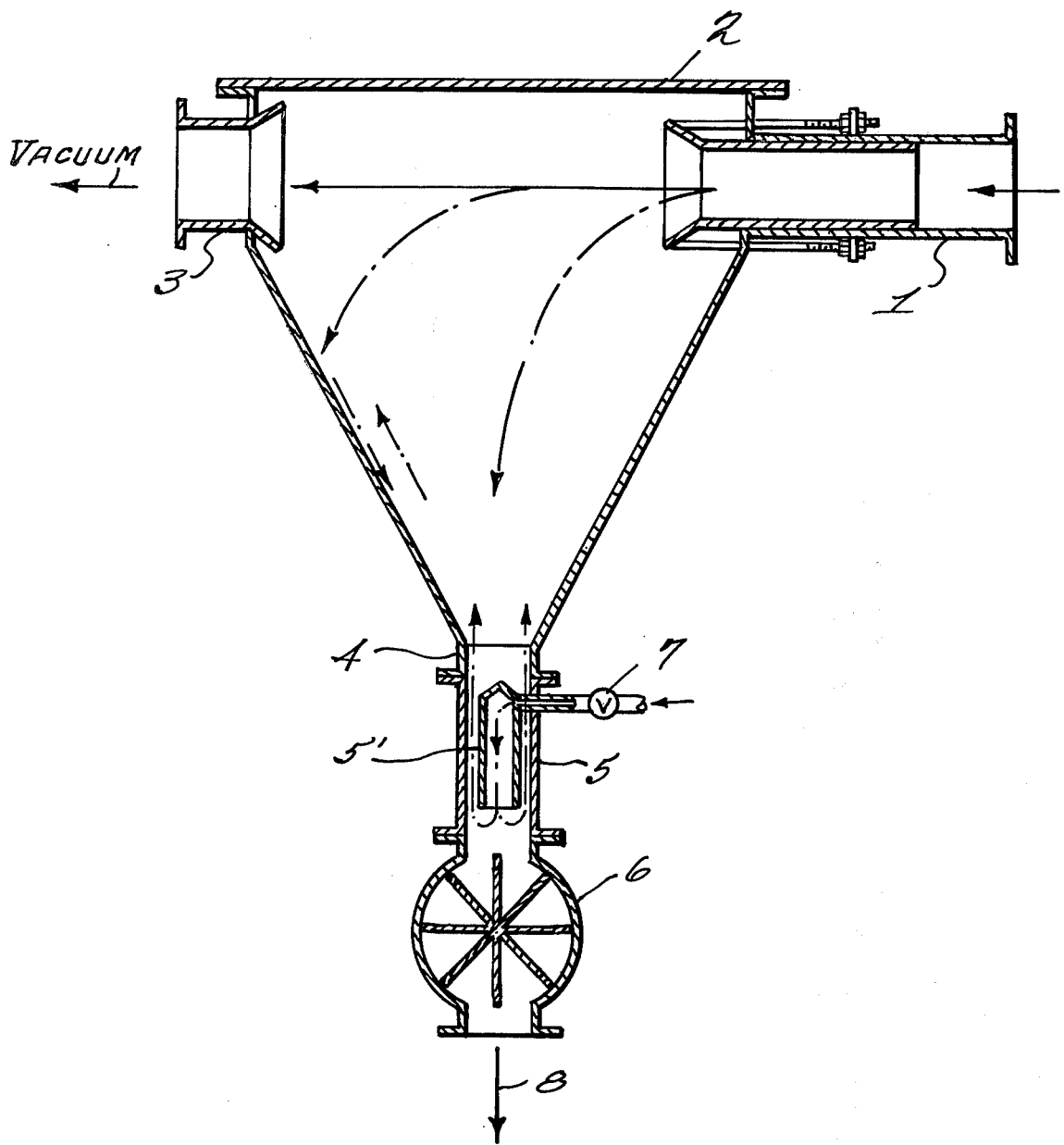
FIG. 1 is a sectional side view of the apparatus of the invention.

Referring more specifically to FIG. 1, a carbon black pigment to be purified is introduced pneumatically laterally through supply tube 1 into the upper region of a closed separator housing 2. The apparatus is under a vacuum by way of suction tube 3. The air stream is slowed down because of the greater cross section in the separator housing which is triangular shaped or conical. The finely divided carbon black is also carried along through tube 3 at the reduced speed. Fine grit and coarse grit on the contrary either falls below directly or slides down the steep walls of the separator housing. In order to operate economically and attain a complete separation of grit and purified finely dispersed pigment there is sucked in from below annularly a very small secondary air stream 4 through a cap shaped displacement body 5. This purifies the coarse grit falling in the short way as fine grit from still adhering finely adhering pigment which is returned to the main stream. The coarse grit falling perhaps in the middle of the housing and the fine grit which falls impingingly and slidingly from the outlet tube, laterally slanting housing walls of the funnel shaped lower portion 18 falls impingingly and slidingly over the outlet connection piece 15 into the bucket wheel (or star) valve 6 and is continuously discharged from this. By opening and closing the slide valve 7 the introduction of the secondary air stream can be regulated. In the open position of the slide valve only grit falls out of the gas stream to be purified, in the closed position a portion of the pigment to be purified also falls out. By observation of the fall out 8 the secondary air stream can be adjusted to optimal conditions so that the entire grit and practically no pure pigment is discharged.

As shown at 20 the outlet tube 3 is preferably projected as a funnel into the separator housing 2.

Figure 2:
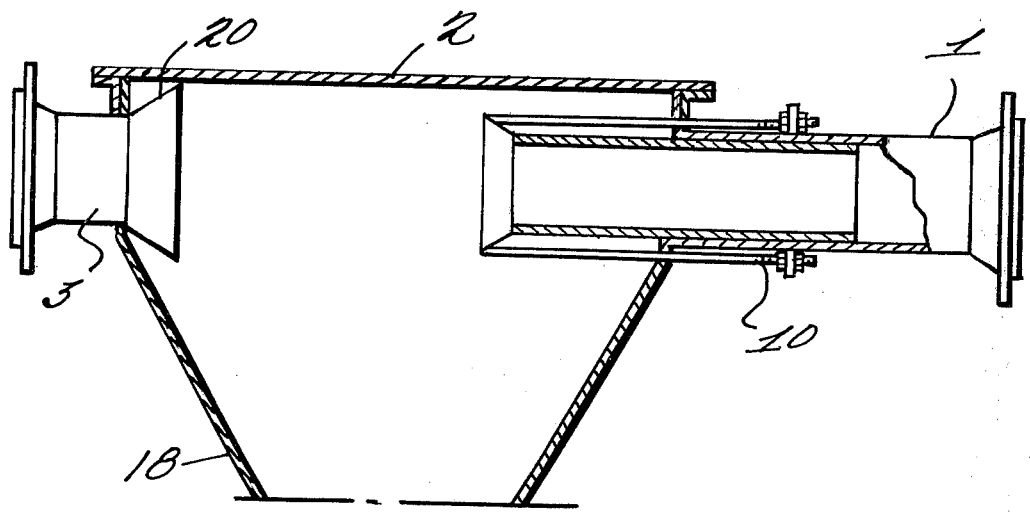
FIG. 2 shows an advantageous arrangement of the conveying gas inlet and outlet tubes.
Figure 3:
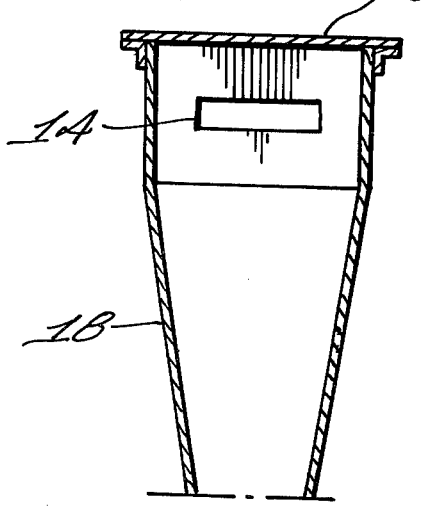
FIGS. 3 and 3a show two advantageous cross sectional shapes for the conveying gas inlet.
Figure 3A:
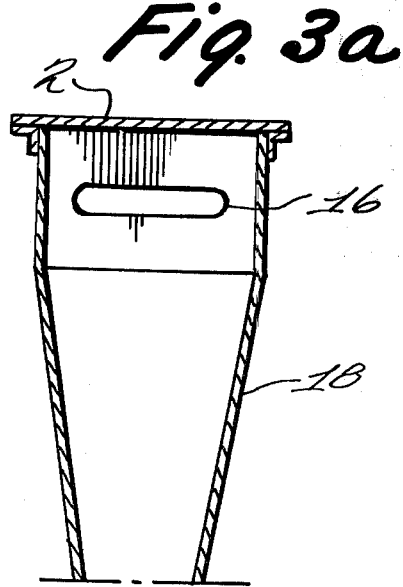
Figure 4:
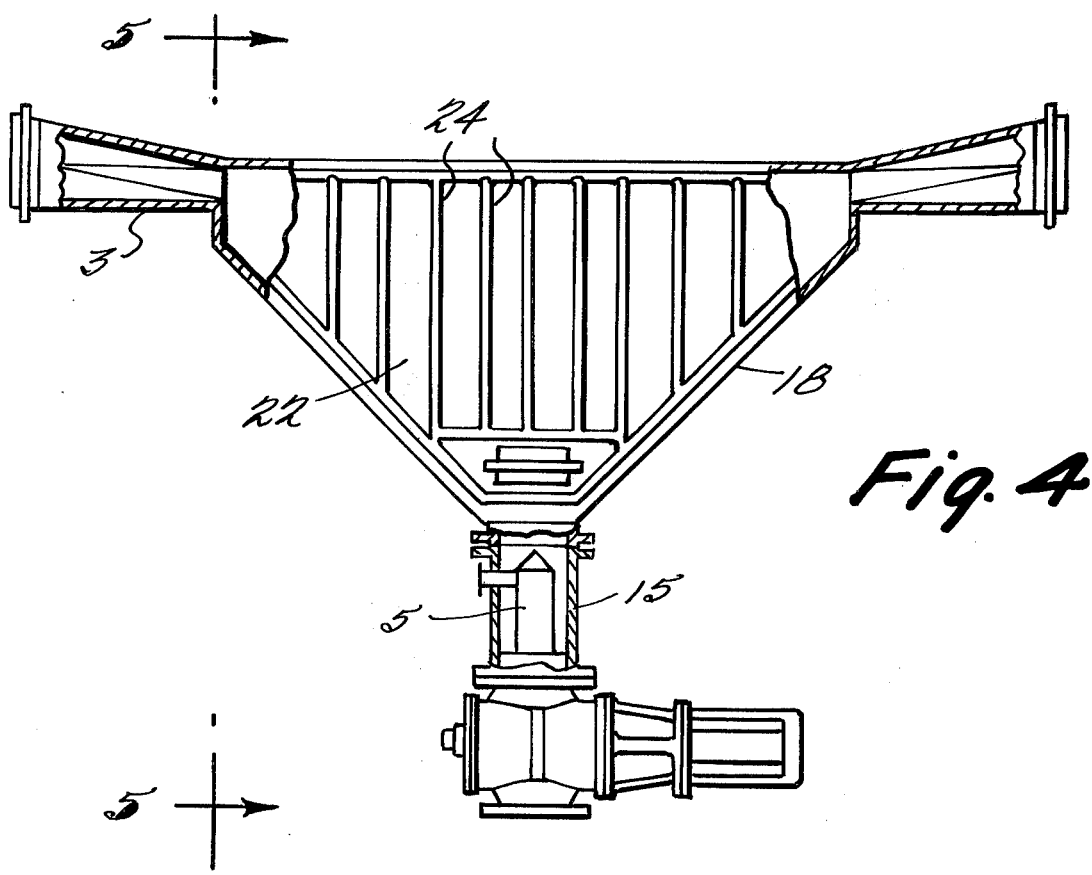
FIG. 4 shows a heatable apparatus according to the invention.
Figure 5:
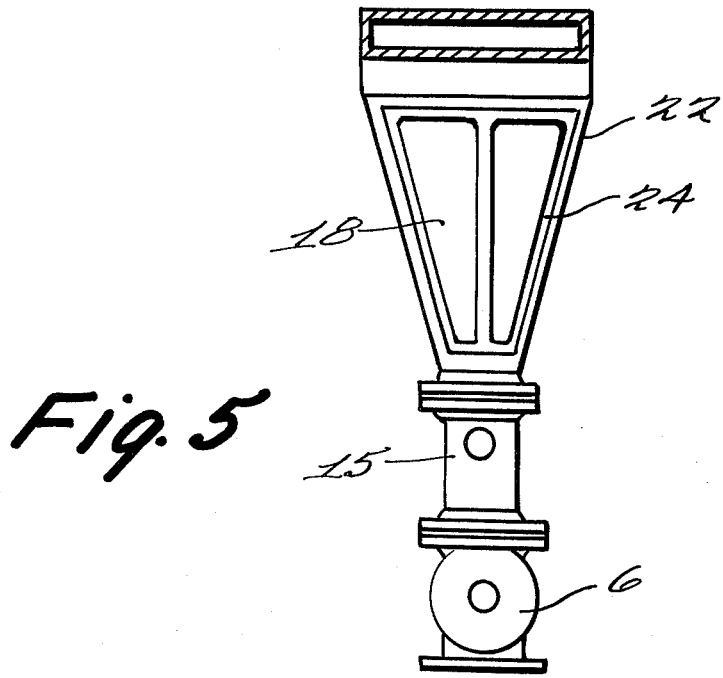
FIG. 5 is view taken along the line 5—5 of FIG. 4.

The principle explained above can be optimized through various forms of construction. According to FIG. 2 the inlet tube 1 is arranged slidingly as shown at 10 so that the distance of falling can be adjusted to the finely dispersed pigment to be purified. Furthermore the vacuum outlet tube 3 projects funnel shaped into the separator housing in order to avoid the carrying over of the already separated grit constituents. In order to produce an equal falling distance for all particles according to FIG. 3 the pigment containing airstream arriving in the tube is reduced without replacing the flow to a flat rectangle 14 in cross section and in FIG. 3a to an oval 16 of the same diameter. Especially novel results have been obtained with such designs. FIGS. 4 and 5 show schematically a suitable form of the apparatus of the invention for avoiding sticking of pigments and fillers with a separator housing jacket 22 heated by steam coils 24.

To further point out the effectiveness of the process of the invention there are present below two examples which explain the ideas of the invention. However, the invention is not limited to the examples.

EXAMPLE 1

In a furnace black plant there was produced an HAF black (Corax 3) with an output of about 200 kg/hour. The separated powder formed black for further working was further transported over a distance of about 30 meters from the separatory plant with the aid of a pneumatic vacuum system. The amount of conveying air amounted to 1600 Nm$^3$/h (standard cubic meters/- hour). In this pneumatic vacuum system there was installed the apparatus of the invention as shown in FIGS. 1 and 3. The pressure drop measured before and after the apparatus amounted to only 25mm of water. The pneumatic system present therefore can be operated without increasing the blower capacity. Clogging did not take place in the apparatus. The discharge from the grit separation apparatus was determined according to particle size during a regular production run in the plant and after a shut down and taking the plant on operating conditions again.

| Day of Operation | Popular production Weight of coarse grit greater than 1mm diameter (grams/day) | Weight of fine grit 0.043–1.0mm diameter (grams/day) | Total grit (grams/day) |
|---|---|---|---|
| 1 | 805 | 54 | 859 |
| 2 | 174 | 73 | 247 |
| 3 | 24 | 4 | 28 |
| 4 | 40 | 12 | 52 |
| 5 | 45 | 54 | 99 |
| 6 | 625 | 457 | 1082 |
| 7 | 278 | 44 | 322 |
| 8 | 965 | 722 | 1687 |
| New Production after shut down of the plant | | | |
| 1 | 7150 | 862 | 8012 |
| | 245 | 136 | 381 |
| | 45 | 41 | 86 |

It can be clearly seen that considerable amounts of impurities are separated out of the product. Especially large amounts of impurities occur after a shut down of the plant. This is obvious because through the temperature changes and changes of the speed of flow the deposits found on the walls of the reactor and the separator plant fall down. Also under these extreme conditions the apparatus of the invention has proven effective.

EXAMPLE 2

This example is also drawn to the production of a furnace black. In an hourly production of 330 kg of furnace black of Type N 285 (Corax 5HS) the separated powdered black was transported pneumatically with 1600 Nm³/h. In the pneumatic system there was again installed a grit separation apparatus according to the invention. The fall in pressure amounted to 30mm water. However, besides the normal way there was also provided a bypass so that it was possible to carry out the pneumatic operation either directly or by way of the grit separation apparatus. Downstream of this point there were taken black samples three times daily and the sieve residue on a 0.043mm sieve determined by wet sieving according to DIN 53580 (German Industrial Standard 53580). The investigations were always started after the new operation of the plant was begun.

| Without the Grit Separation of the Invention | Sieve residue on 0.043mm Sieve in % |
|---|---|
| 1st day | 0.06 |
| | 0.05 |
| | 0.05 |
| 2nd day | 0.11 |
| | 0.06 |
| | 0.04 |
| 3rd day | 0.03 |
| | 0.04 |
| | 0.02 |
| 4th day | <0.01 |
| | <0.01 |
| | <0.01 |

| Without the Grit Separation of the Invention | Sieve residue on 0.043mm Sieve in % |
|---|---|
| With the Grit Separation Plant of the Invention | Sieve residue on 0.043mm sieve in % |
| 1st day | 0.01 |
| | <0.01 |
| | <0.01 |
| 2nd day | <0.01 |
| | <0.01 |
| | <0.01 |
| 3rd day | <0.01 |
| | <0.01 |
| 4th day | <0.01 |
| | <0.01 |
| | <0.01 |
| | <0.01 |

Figure 6:
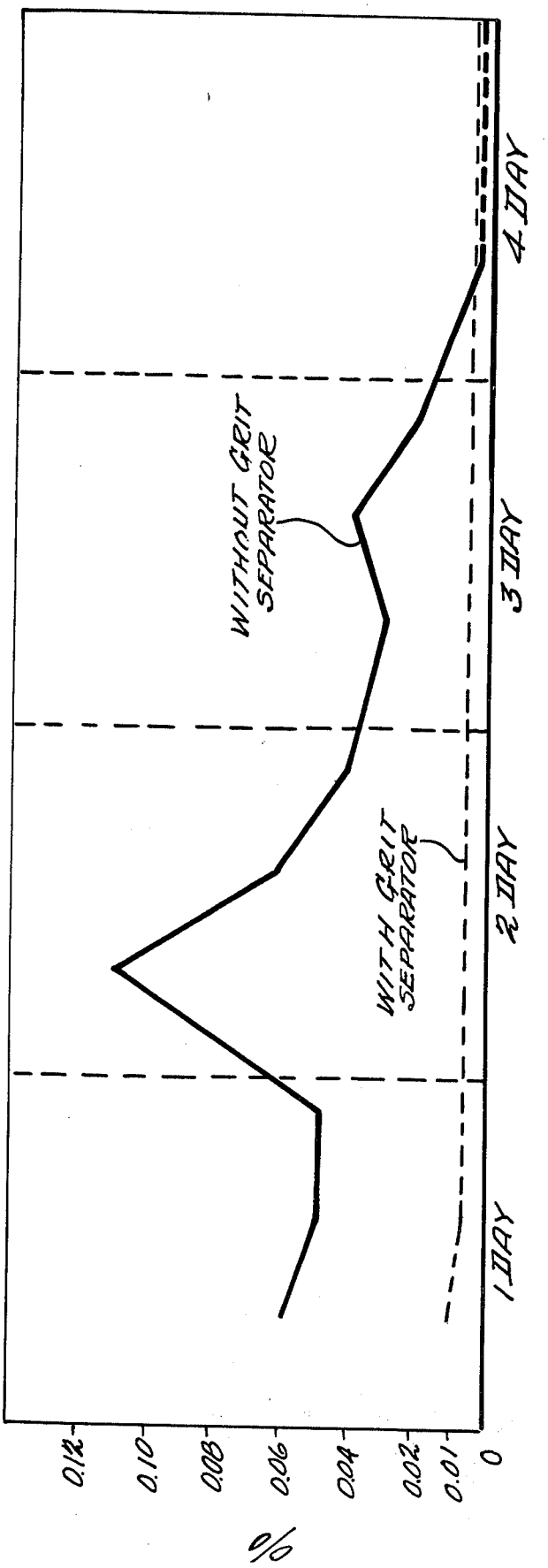
FIG. 6 is a graphical presentation of the comparison of the sieve residues resulting from the production of one type of carbon black with and without use of the apparatus of the invention.

The graphic plotting of these values is given in FIG. 6. From it it can be seen that the quality of furnace black produced with the grit separator is usable immediately after beginning of the production. On the contrary without the new apparatus of the invention the plant had to operate for 3 days before the quality was correspondingly good. The black with the increased grit content is not marketable and must be employed for lesser purposes of use. The effectiveness of the procedure of the invention is impressive, especially if it is considered that only single samples were taken for the determination of grit in the product. In the product produced without the grit separator, without anything else still much higher content of grit could be established if randomly a sample is drawn at the right time. With the grit separator on the other hand, there is the certainty that the final product always has the required degree of purity.

The invention is naturally not limited to the examples. In the examples pneumatic vacuums are described. The invention idea can also be realized in pneumatic pressure systems. In this case to be sure, there must be attached to the slide valve 7 of FIG. 1 for the secondary air, a blower so that the secondary air can be conveyed into the plant.

The idea of the invention is not limited to pneumatic air systems. Rather it can also be used to operate pneumatic systems with protective gases in open style or in the form of closed pneumatic systems.

We claim:

1. Apparatus for the removal of grit from a gas stream pneumatically conveying a finely dispersed solid, said apparatus comprising
    a closed separator housing having an upper portion and a funnel-shaped lower portion, means for introducing said gas stream into said upper portion of said housing, said means comprising a laterally disposed supply tube having a cross-sectional area substantially less that the cross-sectional area of said upper portion of said housing, means for allowing the removal of grit from said gas supply stream as grit falls from said gas stream due to the differential in cross-sectional area between said supply tube and said housing, said means comprising a discharge valve disposed below said housing lower portion, and a vertically disposed connecting member between the lower extremity of said funnel-shaped lower housing portion and said discharge valve, means for withdrawing gas having finely dispersed solid but substantially no grit therein from said housing, said means including an outlet tube extending laterally from said housing upper portion, and means for regulating the range of size of finely dispersed solid and grit that will be removed from said gas stream in said housing, said means including an axially disposed cap-shaped displacement member having an opening in the lower end thereof and disposed in said vertically disposed connecting member, said displacement member having a smaller cross-sectional area than the cross-sectional area of said connecting member and being located substantially concentrically with said connecting member so that an annular gap is formed therebetween, and means for supplying secondary gas under pressure to said displacement member so that a secondary gas stream flow therethrough and upwardly into said separator housing.

2. An apparatus according to claim 1 wherein said outlet tube is connected to means for providing a vacuum in said outlet tube.

3. An apparatus according to claim 1 further comprising means for slidably mounting said supply tube for the conveying gas stream in the separator housing.

4. An apparatus according to claim 3 wherein the conveying gas supply tube is circular in cross section and prior to entry into the separator housing is reduced in diameter and converted to a rectangular cross section.

5. An apparatus according to claim 3 wherein the conveying gas supply tube is circular in cross section and prior to entry into the separator housing is reduced in diameter and converted to an oval cross section.

6. An apparatus according to claim 3 wherein the outlet tube projects funnel-shaped into the separator housing.

7. Apparatus according to claim 6, further comprising means for regulating the flow of secondary gas in said means for supplying secondary gas under pressure to said displacement member.

8. An apparatus according to claim 6 wherein the separator housing has a jacket including heating coils for heating the separator housing.

9. An apparatus according to claim 1 wherein the separator housing has a jacket including means for heating said separator housing.

10. An apparatus according to claim 1 wherein the outlet tube projects funnel-shaped into the separator housing.

11. An apparatus according to claim 1 wherein said discharge valve means is a bucket wheel valve.

* * * * *